United States Patent

Alexander, James et al.

[15] 3,688,467
[45] Sept. 5, 1972

[54] APPARATUS FOR DETECTING AND PREVENTING IRREGULAR CONDITIONS IN ARTICLE HANDLING MACHINE

[72] Inventors: Alexander, James, Belleville; Lester A. Higgins, Montville, both of N.J.

[73] Assignee: Scandia Packaging Machinery Company, North Arlington, N.J.

[22] Filed: April 9, 1970

[21] Appl. No.: 26,942

[52] U.S. Cl. ............................................ 53/77, 53/379
[51] Int. Cl. .................................................. B65b 57/08
[58] Field of Search ............................................ 53/77

[56] References Cited

UNITED STATES PATENTS

| | | | |
|---|---|---|---|
| 2,639,568 | 5/1953 | Brook | 53/77 |
| 3,322,043 | 5/1967 | Vergobbi | 53/77 X |
| 3,405,505 | 10/1968 | Mistarz | 53/375 X |
| 3,576,094 | 4/1971 | Savageau | 53/77 X |

*Primary Examiner*—Travis S. McGehee
*Attorney*—Markva & Smith

[57] ABSTRACT

Electrical and mechanical means are provided in combination for detecting and preventing irregular conditions in an article handling machine. Means are also provided for sequentially starting a machine used with a supply of articles to avoid the running of a machine when an irregular condition exists in the machine. One embodiment comprises a combination including a sensing means located between a receiving means and a package supply work station to detect an irregular package feed condition. A means responsive to the sensing means will stop the feeding of packages into the receiving means thereby preventing damage to the wrapping machine. Various specific structures of the sensing means and responsive means are disclosed. The sensing means and responsive means may be used in any apparatus for conveying articles at predetermined intervals.

8 Claims, 15 Drawing Figures

INVENTORS
JAMES ALEXANDER
LESTER A. HIGGINS

BY *Lowry, Rinehart, Markva & Smith*
ATTORNEYS

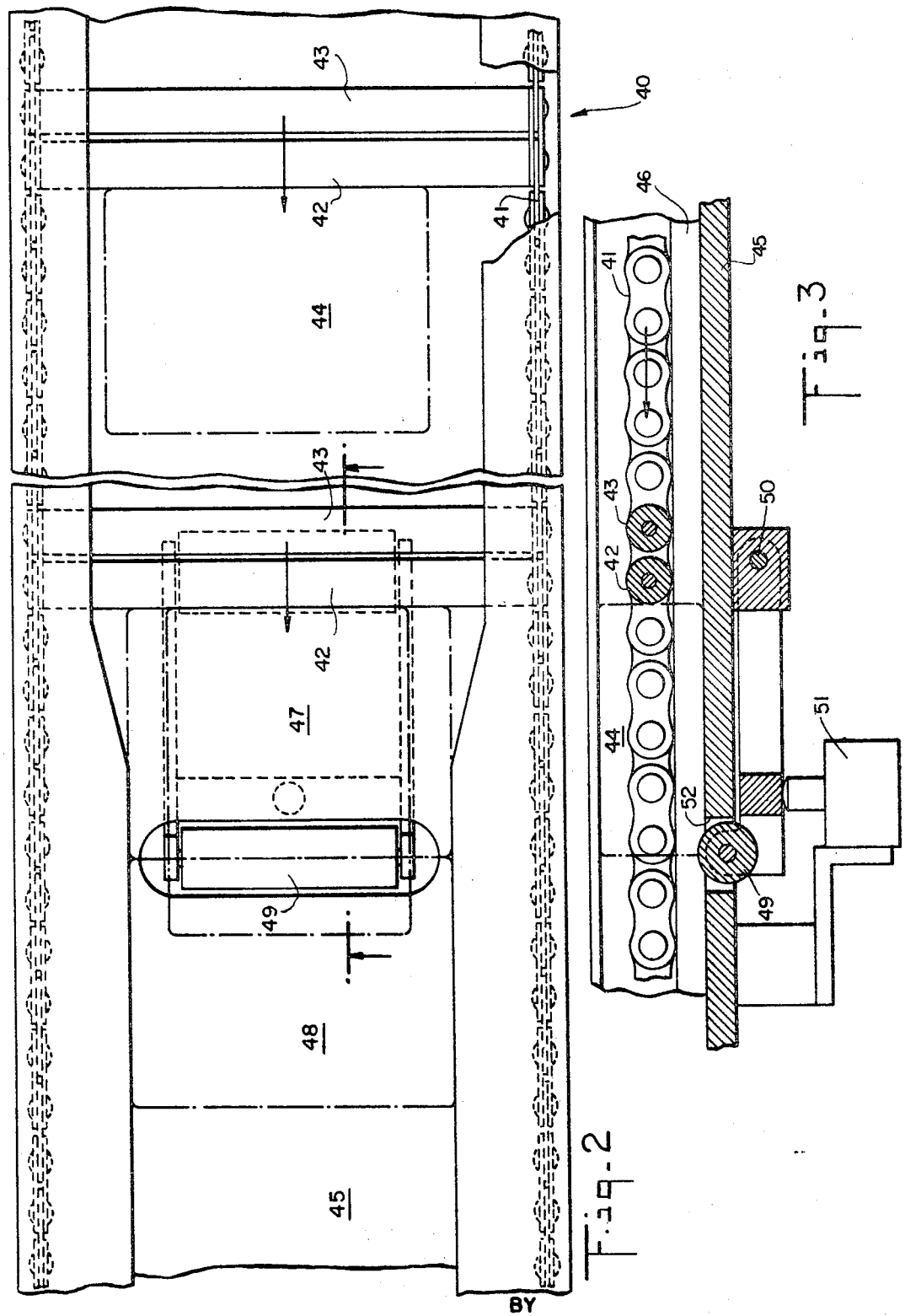

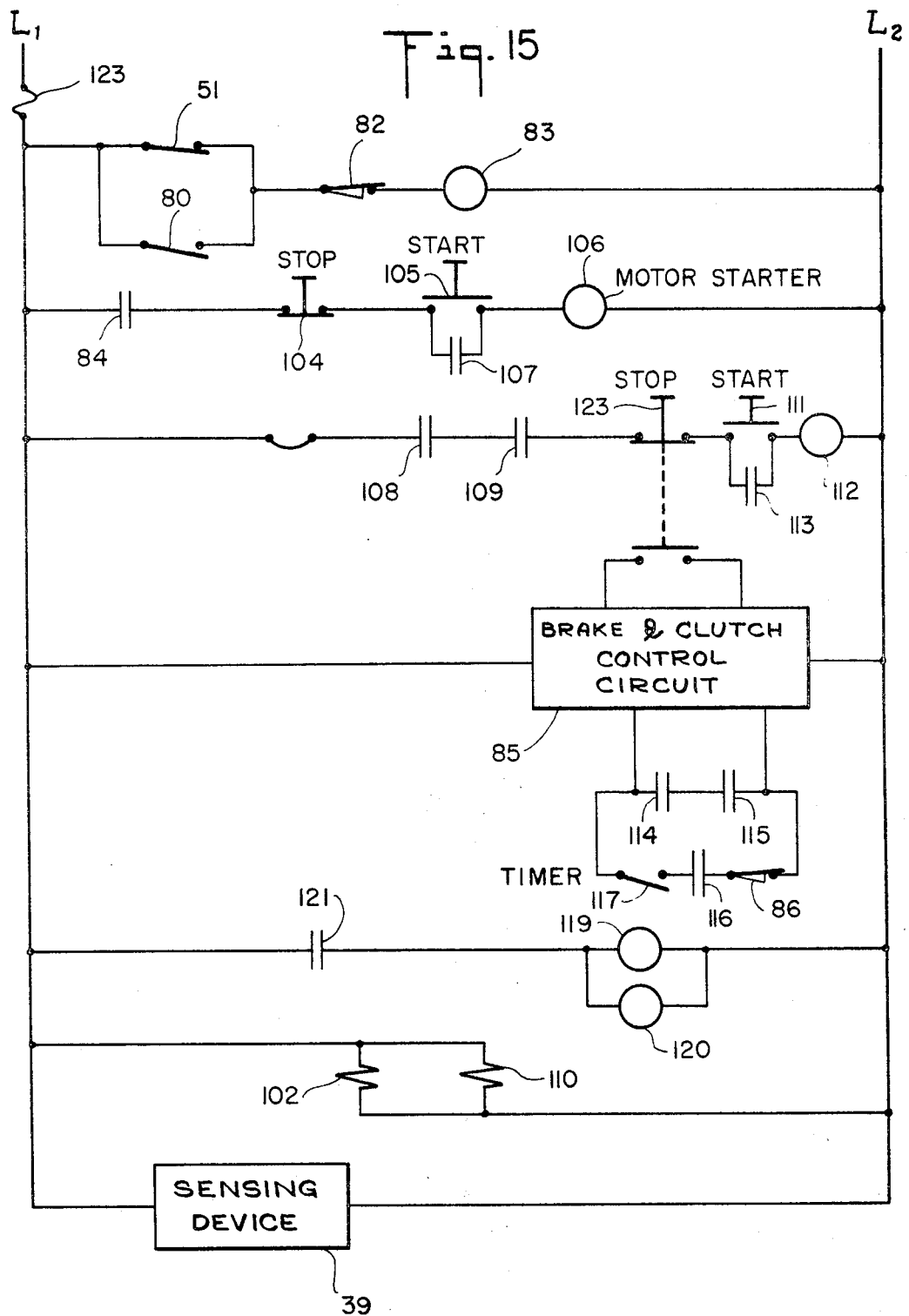

APPARATUS FOR DETECTING AND PREVENTING IRREGULAR CONDITIONS IN ARTICLE HANDLING MACHINE

BACKGROUND OF THE INVENTION

There are many well known types of conveyor means which are used to move articles from a supply work station to various other operational work stations. Where the operational work stations are set up to receive at least one article or a series of articles at predetermined intervals, a very precise feed condition is required. This feed condition is preselected and must be maintained between the supply station and the operational work stations if the machine is to run properly. This fact is especially true where the conveyor means is running under fully automatic conditions.

There are occasions when irregular feed conditions will exist while articles are being conveyed from a supply work station to the operational work stations. If such an irregular feed condition were to be maintained until the articles reach the operational work stations, damage may very well be done to the machine working on the articles. This of course results in a shut down of operation and costly repair work which must be done on the machine. Examples of irregular feed conditions include several situations. If more than one package is fed in a mechanism designed to feed only one package at a time, the conveyor must be stopped. A package improperly oriented with respect to the conveyor means should be detected. Any other similar type of irregular feed condition different from the normal condition for which the conveyor means has been designed must be detected.

The automatic running of machines in industry is well known. A problem exists where an automatic run is started before a complete check has been made to see that all portions of the machine are in working order. Automatic wrapping machines necessarily involve many different operations. Wrapper sheets are supplied in a continuous manner for wrapping packages at predetermined intervals. These packages are fed in an automatic continuous manner from a supply work station into a receiving means. More particularly, such machines often include the over-wrapping of packages with a wrapper sheet in combination with a tear tape. This type of combination necessarily includes many different operations which must be in proper order before the wrapping machine is run automatically. One feature of the present invention is directed to a particular manner of starting the automatic run of the machine to avoid irregular conditions which may damage the wrapping machine.

A common type of wrapping machine known in the prior art includes the use of heater and folder mechanisms for the purpose of folding ends of a wrapper sheet and heat sealing the ends together over the package. The specific mechanical structure of such a heater and folder mechanism is well known in the art and description of same is found in U.S. Pat. No. 2,400,682. As shown in this patent, such a heater folder mechanism is used in combination with a turret wheel assembly used to move packages through a plurality of work stations. The particular problem associated with the present heating and folding mechanisms occurs when the wrapping machine is in a shut down condition. If, for any reason, the wrapping machine operation stops and the heating element is located in the heat sealing position, the package will burn when subjected to prolonged contact with the heating element. One feature of this invention is to prevent the prolonged contacting of the heating element with the package when the wrapping machine is shut down for any reason. The heating element is moved away from the package thereby avoiding the burning of the package or any other deleterious effect caused by prolonged contact with the heating element.

PURPOSE OF THE INVENTION

The primary object of this invention is to provide electrical and mechanical means for detecting and preventing irregular conditions in any article handling machine.

It is a further object of this invention to provide a sensing means responsive to irregular feed conditions in a conveying means to avoid disadvantages attendant prior art conveying devices.

A further object of this invention is to overcome other disadvantages associated with the automatic running of machines such as wrapping machines and to overcome specific problems associated with the use of heat sealing means in wrapping machines.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 2 is a top plan view of an apparatus for conveying articles and made in accordance with this invention;

FIG. 3 is a partial sectional view of the apparatus of FIG. 2;

FIG. 15 is a circuit diagram, showing a starting feature and irregular package condition detector made in accordance with this invention.

DESCRIPTION OF SPECIFIC EMBODIMENTS

Figure 1:
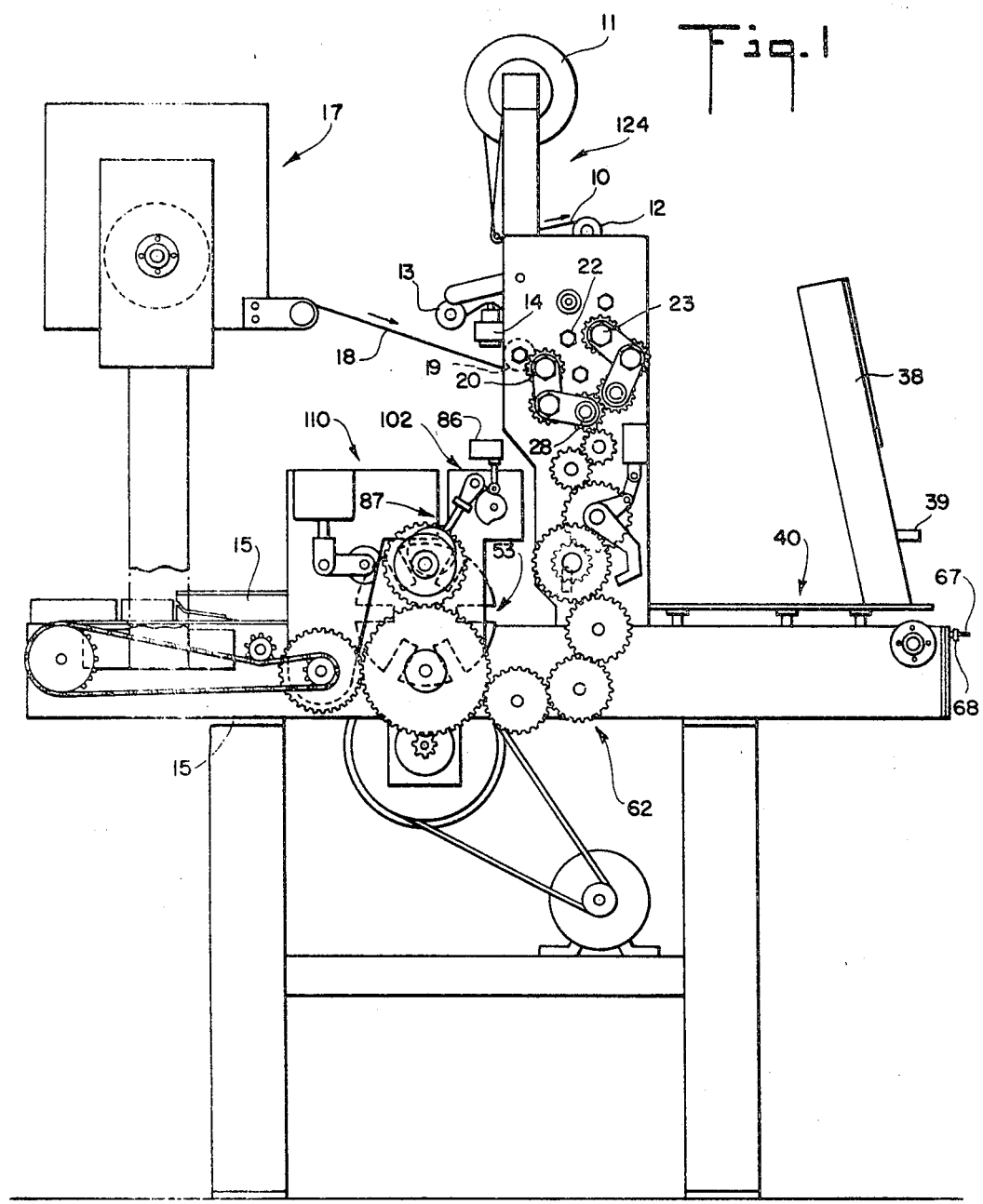
FIG. 1 is a side elevational view partially in section of a wrapping machine incorporating the various features of this invention.
Figure 4:
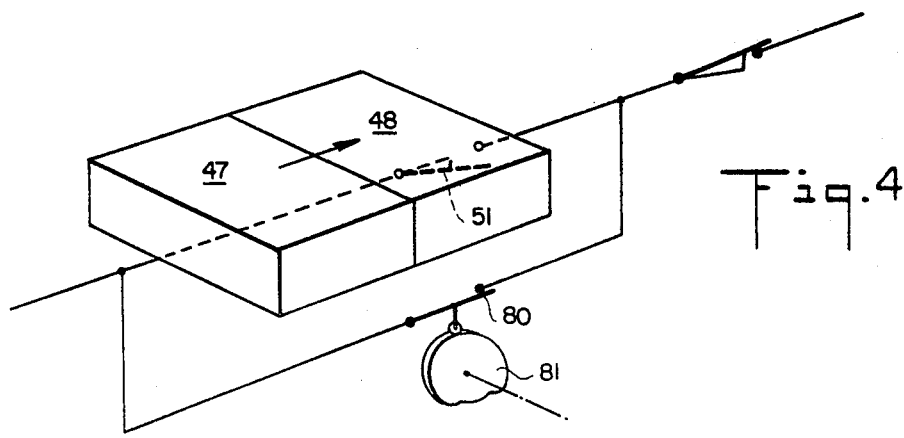
FIG. 4 is a schematic drawing showing the operation of the apparatus of FIG. 2.
Figure 5:
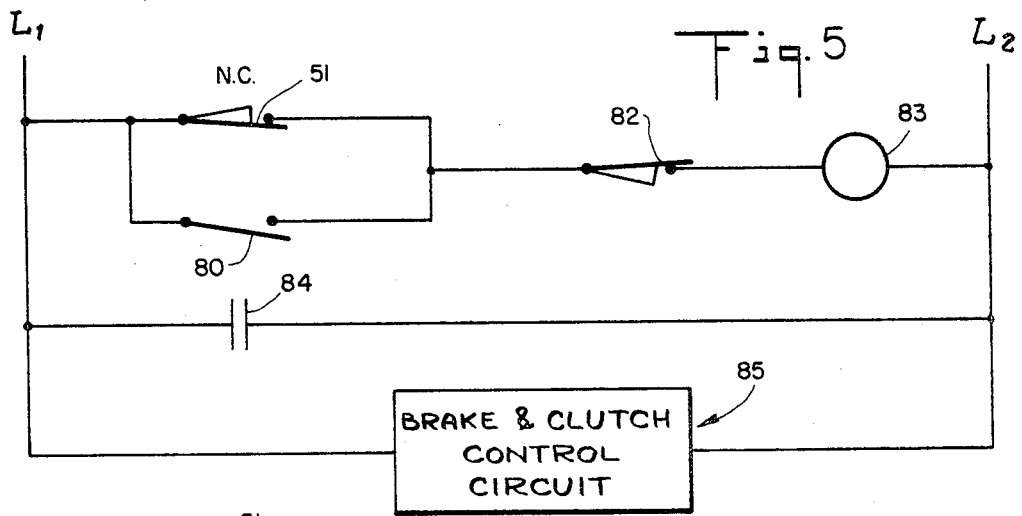
FIG. 5 is a circuit diagram showing the apparatus of FIG. 2 in combination with an article handling machine.
Figure 6:
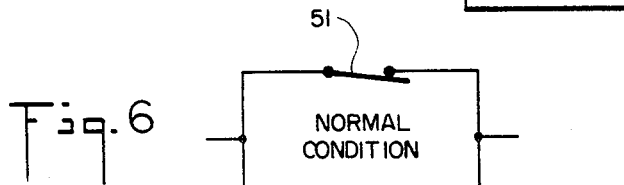
FIGS. 6, 7 and 8 are partial circuit diagrams showing the operation of the apparatus in FIG. 2 under normal conditions.

More specifically, FIG. 1 shows a machine which incorporates the various features made in accordance with this invention. The various features of the apparatus for detecting and preventing irregular conditions within the wrapping machine are more specifically shown in FIGS. 2 through 15. The sensing device 39 on the supply chute 38 is used to sense a predetermined supply level of articles whereby a normal supply of articles will run the wrapping machine in this instance continuously and an abnormal supply of articles will stop the machine.

Generally, the apparatus of this invention incorporates both electrical circuit means and mechanical means to provide the necessary functions.

An electrical circuit for effecting a sequential starting of the machine provides current to the motor (not numbered) which drives the machine. Means is provided for preparing the machine to run. In FIG. 15 on the second horizontal line, a start button 105 is pushed to energize the coil 106. When the coil 106 is energized, the contact relay 107 is turned on and the start button 105 may be released. This is a lock-in magnetic circuit. This type of circuit is well known in the prior art and does not form a part of this invention. However, there is a combination of circuits and other devices which does provide novel means for sequentially starting the machine as shown in FIG. 1. When coil 106 is energized, the motor begins to run and the coil or contact relay 109 is activated. This arms the motor and prepares for the machine to start running.

Upon the pushing of the start button 111, the coil 112 is energized and the contact or coil relay 113 is activated. This is another lock-in magnetic circuit enabling the release of the start button while enabling the machine to continue its run. When the coil 112 is energized, the coil relay 115 is activated as shown in the parallel circuit below the brake and clutch control circuit.

In the first horizontal line of the circuit diagram in FIG. 15, a detector used to sense an irregular package feed condition is located. The switch 82 represents a clutch mechanism that starts the feed mechanism to operate. Once this feed mechanism is started and is running continuously, the coil 83 is energized. Upon energizing the coil 83, the coil relays 84 and 108 are activated thereby preparing the circuit for starting the motor by way of the magnetic circuit including the button 105, coil 106 and contact relay 107. At the same time that the coil relay 84 is activated by coil 83, the coil relay 114 is activated in the brake and clutch control circuit. For this reason, there is a completed circuit through the brake and clutch control device as soon as the start button 111 is depressed. In other words, the current is allowed to flow through the brake and clutch control circuit thereby empowering the machine to run.

It is seen that this sequential procedure for starting up the motor enables the operator to consider all areas of the machine before the machine is placed in a fully automatic operational condition.

Figure 10:
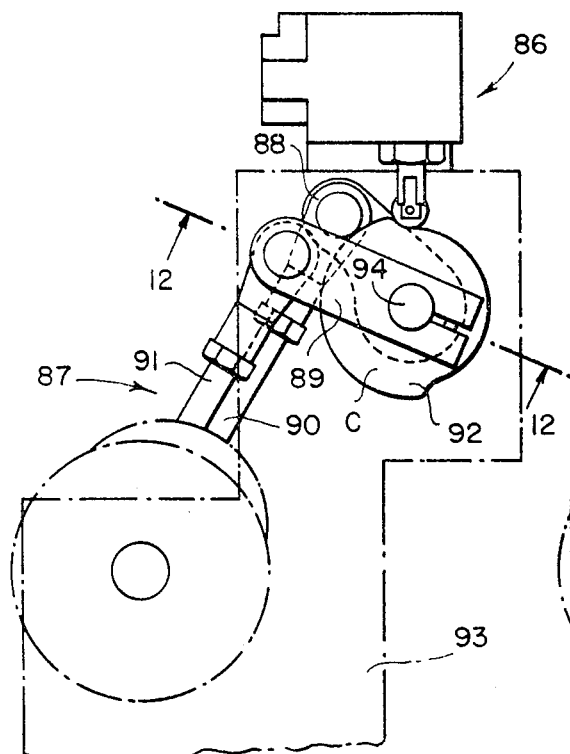
FIG. 10 is a side elevational view of the actuating means for a heat sealing mechanism made in accordance with this invention.
Figure 11:
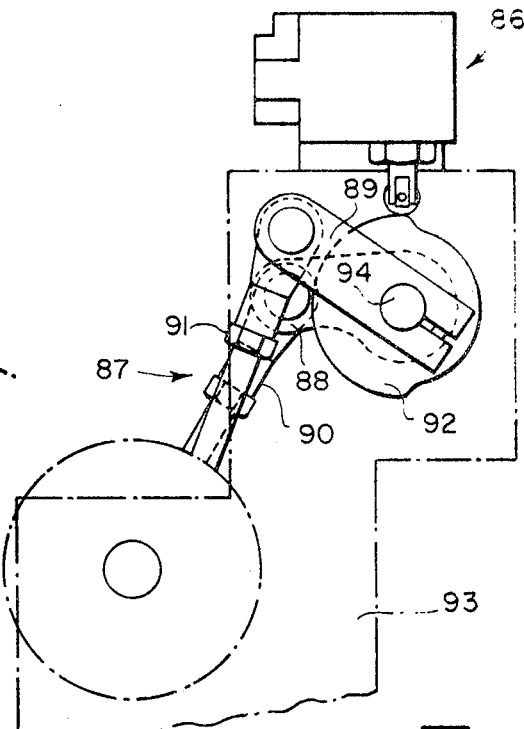
FIG. 11 is a side elevational view of the apparatus of FIG. 10 shown in another operational position.
Figure 13:
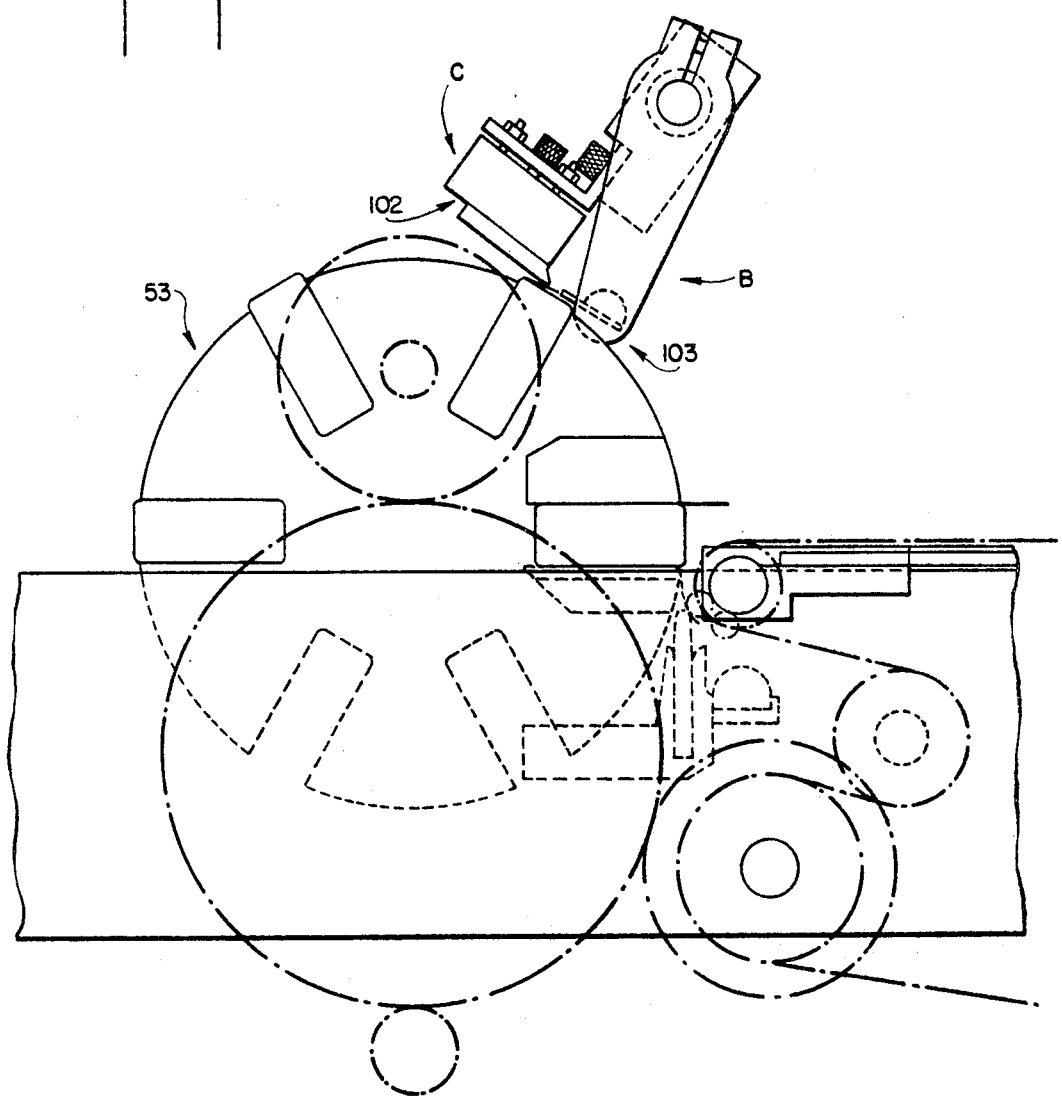
FIG. 13 is a diagrammatic view of a heat sealing mechanism shown in the sealing position.
Figure 14:
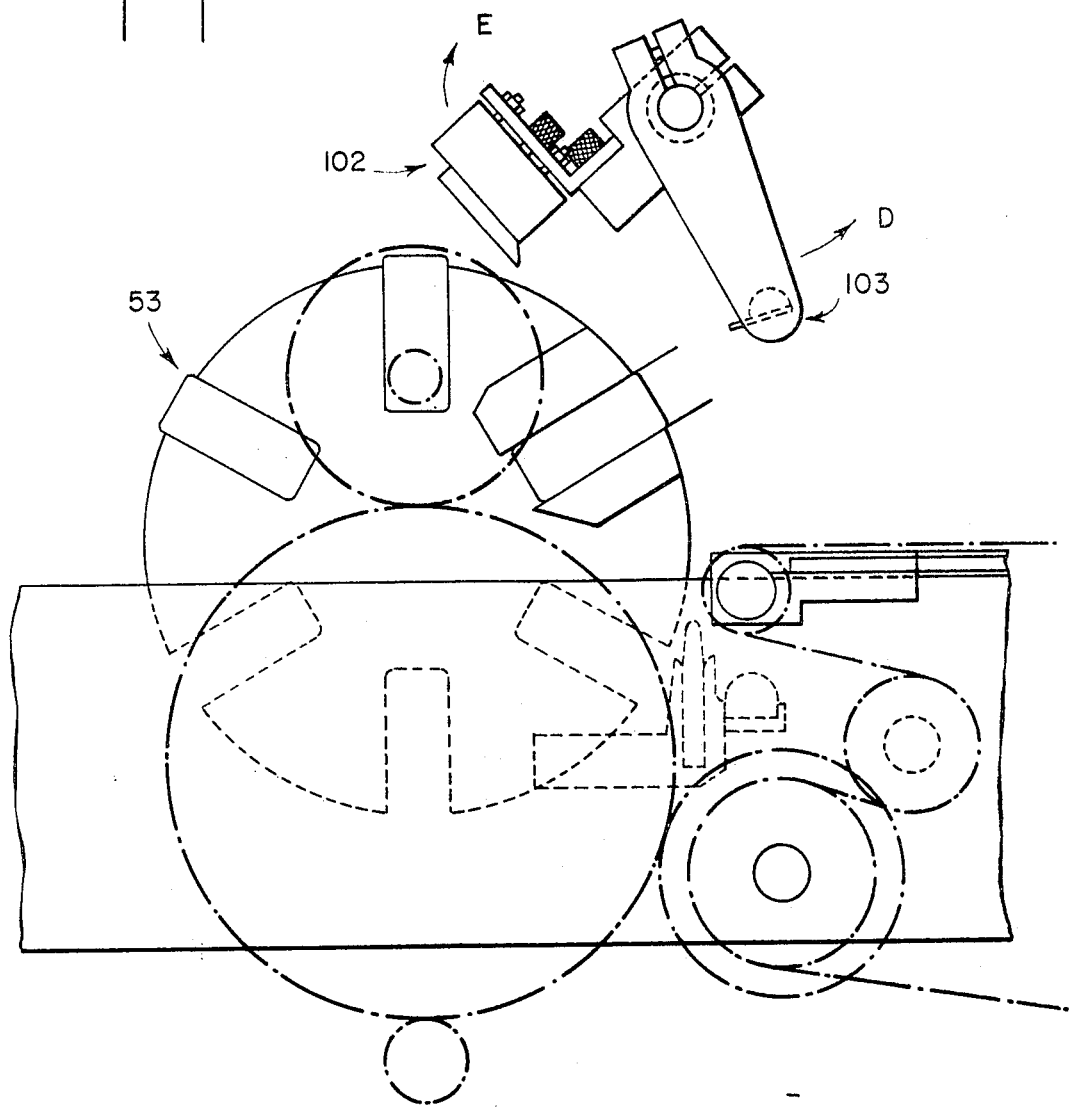
FIG. 14 is a diagrammatic view of the apparatus of FIG. 13 shown in a shut down position.

It is noted that when the start button 111 is pressed, the timer switch 117 immediately closes thereby providing an additional parallel path for electrical current to flow in the brake and clutch control circuit. This specific electrical circuit means including the timer 117, the coil relay 116 and microswitch 86 is used to effect a retracting of a heat sealing means away from a package to avoid burning of the package. In this specific embodiment, a turret wheel assembly 53 is used to receive packages. A heat sealing means constituted by a heater element 102 in FIGS. 13 and 14 is located adjacent the turret wheel assembly 53 at a heat sealing working station. The microswitch 86 as shown in FIGS. 10 and 11 is activated between an open and closed position by virtue of the oscillating cam 92. The heating and folding mechanism 87 includes rods 90 and 91 which operate levers 89 and 88, respectively, to oscillate the heating element 102 and folding member 103 between the positions shown in FIGS. 13 and 14. When the cam position as shown in FIG. 10 exists, the heater element 102 and folder member 103 are in the sealing position as shown in FIG. 13. When the cam is in the position as shown in FIG. 11, the heater element 102 and folder member 103 are in the arrest position as shown in FIG. 14. If, for any reason, the parallel circuit of FIG. 15 including the coil relay 114 and coil relay 115 is deactivated, the parallel line including the timer switch 117, coil relay 116 and microswitch 86 will enable current to be maintained as long as the microswitch 86 remains closed. The closed position is shown in FIG. 10 and FIG. 13. Therefore, current will continue to flow and the machine will continue to run until such time that the heater 102 and folder 103 move away from the package as shown in FIG. 14 and the microswitch 86 is opened by virtue of its movement on the cam surface as shown in FIG. 11. At that time, the total circuit within the brake and clutch circuit as shown in FIG. 15 will be opened and the machine will stop running.

Figure 12:
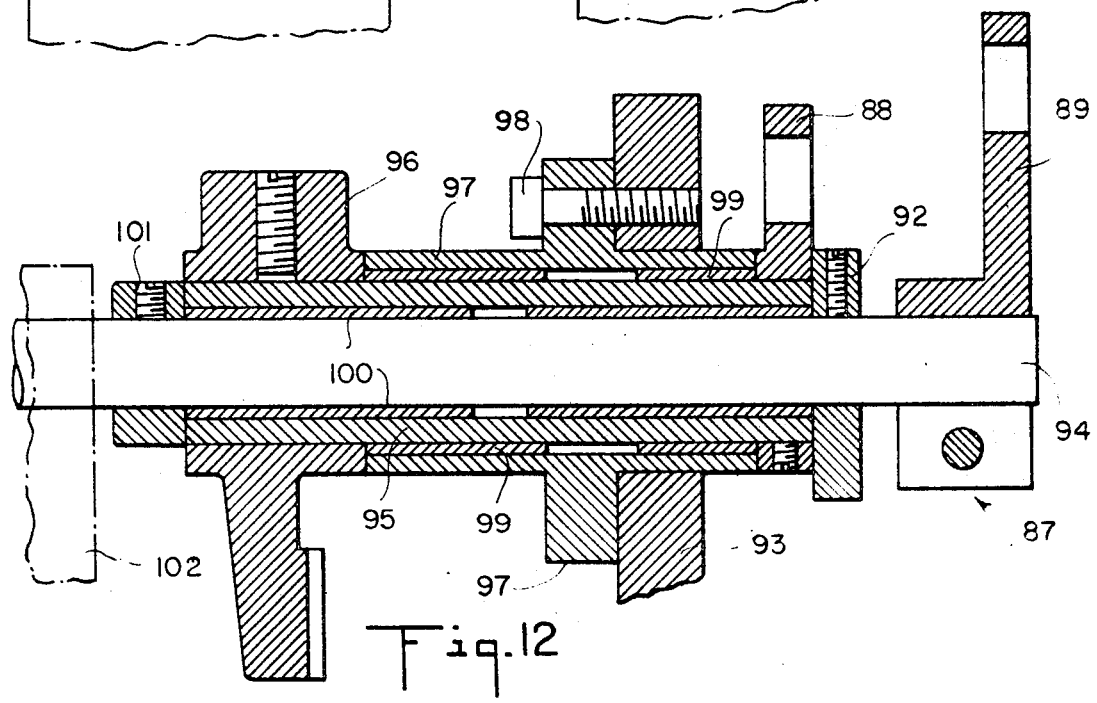
FIG. 12 is a sectional view taken along line 12—12 of FIG. 10.

The manner in which the heater element and folder arm is moved through its mechanical arrangement is shown in FIG. 12. The heater arm 89 is fixedly mounted on the shaft 94 and oscillates the heater 102 back and forth. The folder arm 88 is coaxially arranged with respect to the shaft 94 and moves the folder arm 96 back and forth. This assembly is attached to the frame 93 by virtue of the anchor part 97 and bolt 98. Bushings 99 and 100 enable the folder arm 96 to oscillate with respect to shaft 94. The cam 92 is seen to be fixedly mounted onto the shaft 94 and therefore oscillates with the heater element 102.

Figure 9:
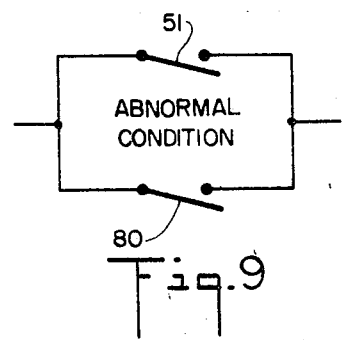
FIG. 9 is a partial circuit diagram showing the operation of the apparatus of FIG. 2 under irregular package feed conditions.
Figure 7:
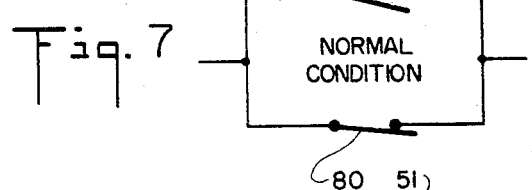
Figure 8:
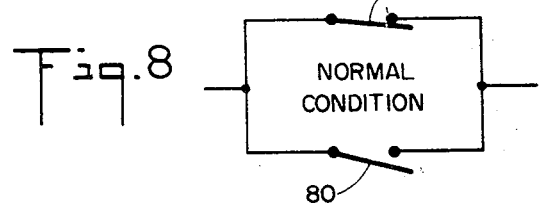

The pusher and detecting assembly generally designated 40 as shown in FIGS. 2 and 3 include a sensing means 49. As a package 44 moves over the roller 49, the member pivots about the pin 50 and opens the detecting circuit by way of the switch means 51. The packages are delivered in a predetermined interval. A synchronized circuit with this predetermined interval includes a cam switch 80 and a cam surface 81 that is rotatably mounted in a 1:1 relationship. That is, for each cycle of the wrapping machine, the shaft revolves the cam surface 81 one time. The cam operates the cam switch 80 which may be located at any desired place on the wrapping machine. In this particular embodiment, it is located on the feed chain drive shaft (not numbered). Its particular location is not important. Its specific function is extremely important. The cam surface 81 causes the second switch 80 to open and close in synchronization with the opening and closing of the first switch 51. When at least one of these switches 51 or 80 is closed during normal package feed condition, the conveyor chains 41 continue to operate. However, when both of the switches 51 and 80 are open during an abnormal package feed condition, the conveyor chains 41 are stopped. The chains 41 stop when the machine stops running in this embodiment. A typical abnormal package feed condition is shown in FIG. 2 wherein two packages 47 and 48 are fed into the machine at the same time. This causes both switches to be opened as shown in FIG. 9. When these two switches 51 and 80 are open, the coil 83 is de-energized thereby de-energizing the coil relay 84 and a coil relay in the circuit of the brake and clutch circuit 85. In this specific embodiment, the coil relay 114 is deactivated to stop the running of the machine.

It is seen that although the irregular feed condition detector and the delayed retracting system for the heat sealing means are shown in combination, they may also be used separately.

While the apparatus for detecting and preventing irregular conditions in article handling machine has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. In a wrapping machine, the combination comprising:
   a. means for receiving a package from a package supply work station,
   b. means for moving packages along a package support means from the package supply work station into said receiving means,
   c. sensing means disposed at a location along the package support means to touch packages as they move from the package supply work station to the receiving means to detect an irregular package feed condition, and
   d. means responsive to said sensing means to stop the feeding of packages into the receiving means,
   e. said responsive means including a first switch means adapted to be operated by said sensing means, a movable cam surface and second switch means adapted to be operated by said movable cam surface,
   f. said first and second switch means being adapted to maintain and stop electrical current to control the operation of the moving means.

2. In a wrapping machine as defined in claim 1 wherein
   said cam surface is rotatably mounted on the wrapping machine and causes said second switch means to open and close in synchronization with the opening and closing of said first switch means,
   said moving means continues to operate when at least one of said switch means is closed during normal package feed condition,
   said moving means is stopped when both of said switch means are open during an abnormal package feed condition.

3. In a wrapping machine, the combination comprising:
   a. means for receiving a package from a package supply work station,
   b. means for moving packages along a package support means from the package supply work station into said receiving means,
   c. sensing means located between the receiving means and the package supply work station to detect an irregular package feed condition,
   d. said sensing means being disposed at a location along the package support means to touch packages as they move from the package supply work station to the receiving means,
   e. means responsive to said sensing means to stop the feeding of packages into the receiving means when an irregular package feed condition is detected,
   f. said responsive means including an electrical circuit means for controlling said moving means, first switch means adapted to be operated by said sensing means, a movable cam surface, and second switch means adapted to be operated by said movable cam surface,
   g. said first and second switch means being electrically parallel in said electrical circuit means,
   h. at least one of said switch means being adapted to maintain current flow in said electrical circuit means under normal package feed conditions and both of said switch means being adapted to stop current flow in said electrical circuit means under abnormal package feed conditions.

4. In a wrapping machine as defined in claim 3 wherein
   said cam surface is rotatably mounted on the wrapping machine and causes said second switch means to open and close in synchronization with the opening and closing of said first switch means.

5. An electrical circuit for effecting a sequential starting of a wrapping machine that includes means for receiving packages from a package supply work station, means for moving said packages to a plurality of work stations, means for feeding packages from the package supply work station into said receiving means, and heat sealing means, said electrical circuit comprising:
   a. means providing current to the motor which drives the machine,
   b. means for preparing the machine to run,
   c. means providing power from the motor to the machine for running the machine automatically,
   d. supply sensing means responsive to a predetermined supply level of articles whereby a normal supply of articles will run the machine continuously and an abnormal supply of articles will stop the machine,
   e. feed sensing means responsive to a predetermined article feed condition whereby a normal article feed condition will allow the machine to run continuously and an abnormal article feed condition will cause the machine to stop, and
   f. means providing power to the heat sealing means located at a heat sealing work station whereby the heat sealing means moves away from the package in the receiving means thereby preventing burning of the package after other portions of the machine have stopped running automatically.

6. An apparatus for conveying articles comprising:
   a. means for receiving articles from a package supply, b. conveyor means for moving articles from the package supply to said receiving means at predetermined intervals, c. detecting circuit means including means for sensing an irregular article feed condition and first switch means adapted to be operated by said sensing means, d. said sensing means being located between the receiving means and the article supply, e. synchronized circuit means including a second switch means electrically disposed parallel to said first switch means and means for operating said second switch means in synchronization with said predetermined intervals, f. said synchronized circuit means being effective to stop the feeding of articles into the receiving means when an irregular article feed condition is detected by said sensing means.

7. An apparatus as defined in claim 6 wherein said sensing means includes means to open and close said first switch means to control the flow of current through said detecting circuit, whereby when the sensing means detects the presence of an article said first switch means is open and when the sensing means does not detect the presence of an article said first switch means is closed, said synchronized circuit means includes means to close said second switch means when an article is scheduled to pass said sensing means in accordance with said predetermined interval and means to open said second switch means when no articles are scheduled to pass said sensing means, whereby an article detected by said sensing means out of schedule with said predetermined interval causes both said first and second switch means to be opened simultaneously thereby stopping said conveyor means.

8. In a wrapping machine, the combination comprising:

a. means for receiving a package from a package supply work station, b. heat sealing means located adjacent the receiving means at a heat sealing work station, c. sensing means located at the package supply work station to detect the presence of packages at said supply work station, d. first means responsive to said sensing means to stop the running of the wrapping machine at a predetermined supply level whereby the machine runs automatically until said predetermined supply level is reached, e. second means responsive to the stop condition caused by said first responsive means to move the heat sealing means away from a package disposed in said receiving means thereby preventing burning of the package, and f. electrical circuit means to effect a sequential starting of the wrapping machine to run in a fully automatic operation.

* * * * *